United States Patent
Lewis et al.

(10) Patent No.: US 6,349,920 B1
(45) Date of Patent: Feb. 26, 2002

(54) POPPET VALVE SHAPING FOR QUICK VALVE OPENING

(75) Inventors: Stephen R. Lewis, Minonk; Charles B. Looney, Gridley; Wade J. Robel, Normal; Larry R. Mitzelfelt, Jr., Morton; David E. Martin, Normal; James D. Griffith, Chenoa; J. Duwayne Manahan; Avtar S. Sandhu, both of Bloomington, all of IL (US)

(73) Assignee: Caterpillar Inc., Peoria, IL (US)

( * ) Notice: Subject to any disclaimer, the term of this patent is extended or adjusted under 35 U.S.C. 154(b) by 30 days.

(21) Appl. No.: 09/122,255

(22) Filed: Jul. 24, 1998

(51) Int. Cl.⁷ .............................. F16K 51/00
(52) U.S. Cl. ............ 251/122; 137/625.69; 251/282; 251/333
(58) Field of Search ............... 251/282, 118, 251/333, 120, 121, 122, 356, 359; 137/625.69, 625.26

(56) References Cited

U.S. PATENT DOCUMENTS

| | | | | |
|---|---|---|---|---|
| 3,307,586 A | * | 3/1967 | Meyer | 137/625.69 |
| 3,762,443 A | * | 10/1973 | Sorenson | 251/282 X |
| 4,270,575 A | * | 6/1981 | Reed et al. | 137/625.69 |
| 4,580,760 A | * | 4/1986 | Harris | 251/77 |
| 4,651,776 A | * | 3/1987 | Nakano et al. | 137/625.69 |
| 4,717,118 A | | 1/1988 | Potter | 251/129.02 |
| 4,869,462 A | | 9/1989 | Logie et al. | 251/129.16 |
| 4,941,508 A | * | 7/1990 | Hennessy et al. | 251/282 |
| 5,172,887 A | | 12/1992 | Cross et al. | 251/129.19 |
| 5,271,371 A | * | 12/1993 | Meints et al. | 137/625.64 X |
| 5,375,576 A | | 12/1994 | Ausman et al. | 123/446 |
| 5,478,045 A | | 12/1995 | Ausman et al. | 251/54 |
| 5,553,635 A | * | 9/1996 | Gregoire | 251/282 X |

FOREIGN PATENT DOCUMENTS

| | | | |
|---|---|---|---|
| GB | 848871 | 12/1955 | |
| GB | 2 041 173 | 1/1980 | F16K/3/314 |
| GB | 2 165 031 | 10/1984 | F16K/3/24 |
| GB | 2 215 814 | 3/1988 | F16K/3/24 |

* cited by examiner

Primary Examiner—Kevin Shaver
Assistant Examiner—John Bastianelli
(74) Attorney, Agent, or Firm—Eric M. Bram

(57) ABSTRACT

A spool slides in a bore to open and close a valve. The spool moves in a first direction until the spool forcibly engages a seat in the bore, closing the valve. The spool moves in a second direction opposite the first direction so that the spool disengages with the seat, opening the valve. Proper configuration of the spool and bore geometries in the vicinity of the seat keeps static pressure from developing that could otherwise retard spool valve opening.

4 Claims, 2 Drawing Sheets

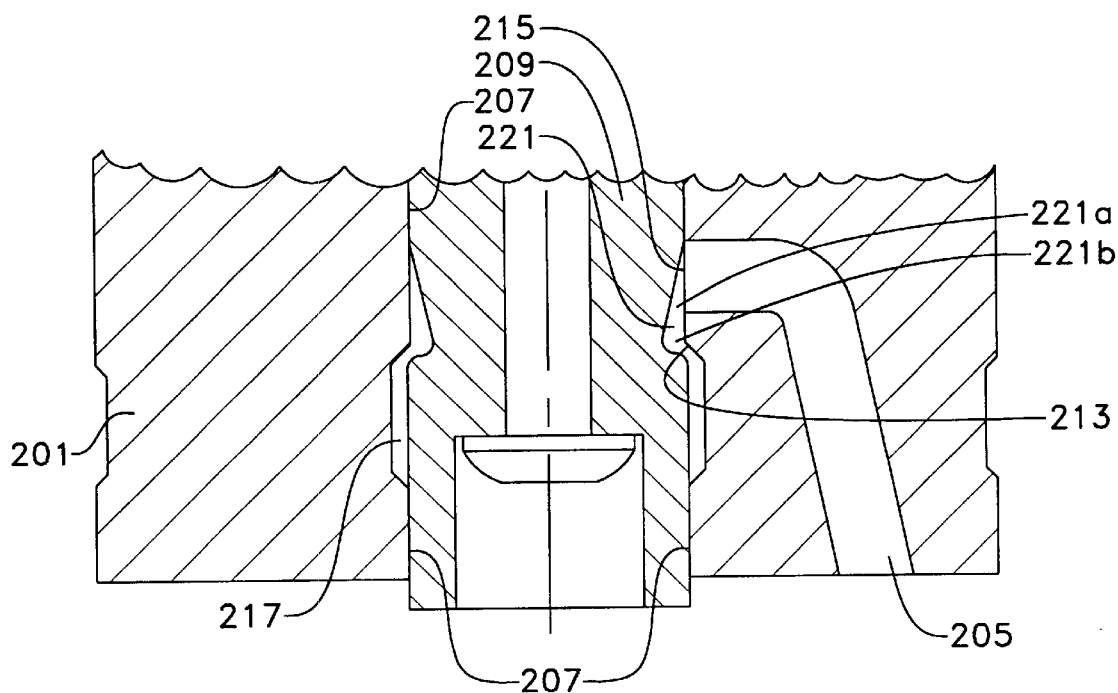
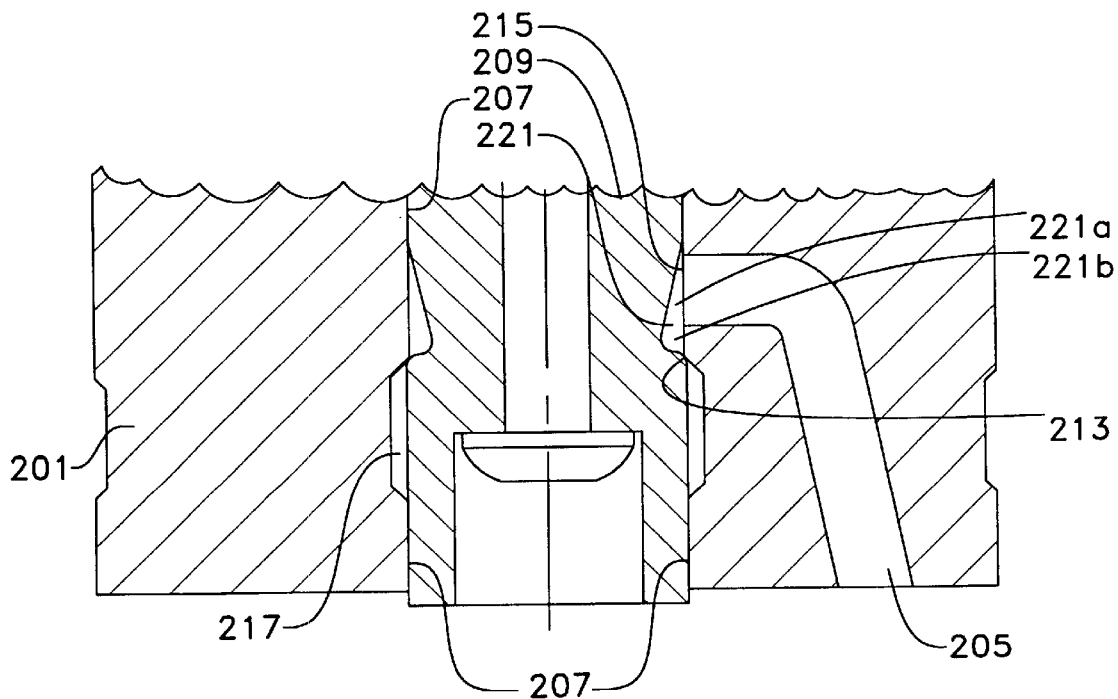

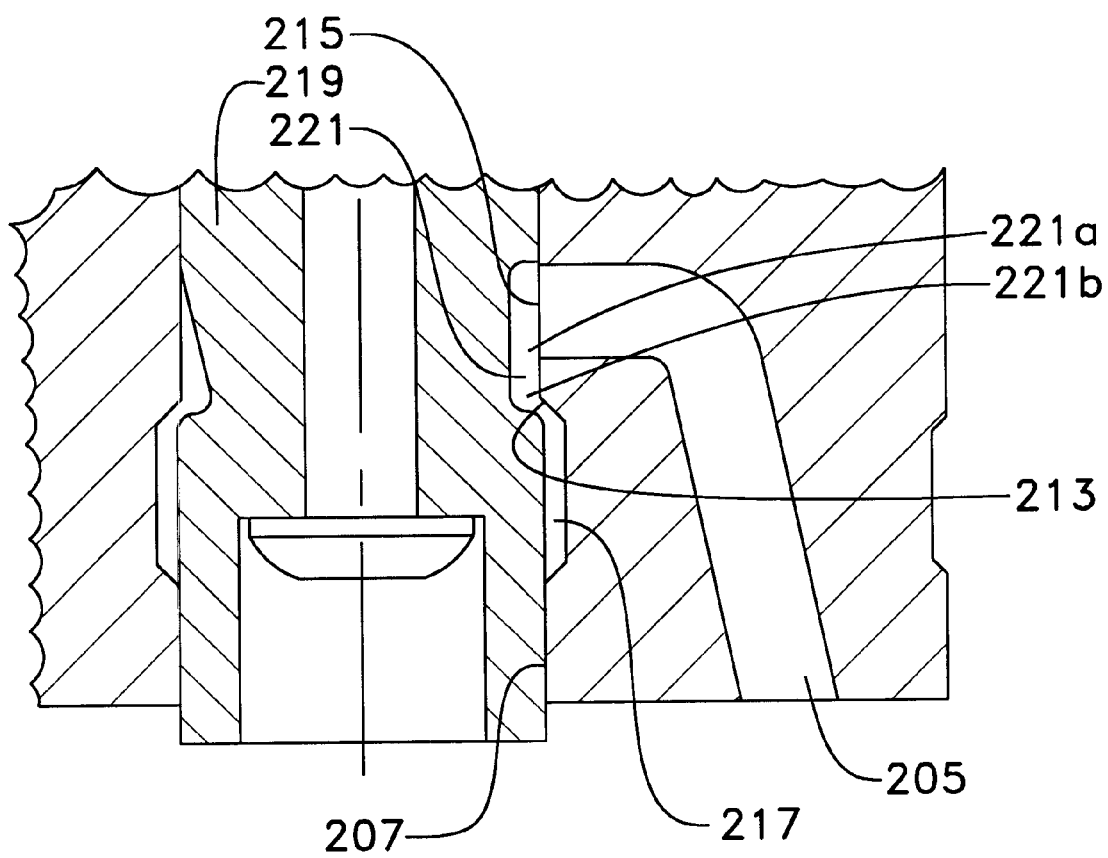
Fig_3

POPPET VALVE SHAPING FOR QUICK VALVE OPENING

TECHNICAL FIELD

This invention relates generally to poppet valves, and more particularly to poppet valves in fuel supply systems.

BACKGROUND

In many valves, for example poppet valves for fuel injectors, an actuator is used to pull a poppet type spool to one of at least two positions—one in which the spool engages a seat (to open or close the valve) and one in which the spool is not engaged with the seat. In this type of valve, control of the spool's movement toward and away from its seated position is desirable. For example, it is advantageous to have the spool unseat very quickly when the valve is to move to the open valve position, in order to fully open the valve so as to get the full desired fluid flow as quickly as possible.

This invention is directed at overcoming one or more of the above problems.

DISCLOSURE OF THE INVENTION

In one aspect of the invention, a poppet valve includes a valve body including a bore therein. The bore includes an inlet port for admitting fluid to the bore. The bore also includes at least one seat. A spool in the bore slides between an open position in which the spool is spaced from the seat, and a closed position in which the spool is engaging the seat. The spool and the bore at least partially define an upstream fluid flow volume in fluid communication with the inlet port. The seat is also in fluid communication with the inlet port, via the upstream fluid flow volume. The upstream fluid flow volume is configured such that when the spool is at the open position and fluid is flowing from the inlet port to the seat via the upstream fluid flow volume, an effective flow area for fluid entering the upstream fluid flow volume from the inlet port does not significantly exceed an effective flow area for fluid passing between the spool and the seat.

In another aspect of the invention, a poppet valve includes a valve body including a bore therein. The bore includes an inlet port for admitting fluid to the bore. The bore also includes at least one seat. A spool in the bore slides between an open position in which the spool is spaced from the seat, and a closed position in which the spool is engaging the seat. The spool and the bore at least partially define an upstream fluid flow volume in fluid communication with the inlet port. The seat is also in fluid communication with the inlet port, via the upstream fluid flow volume. The valve comprises pressure controlling means for keeping static fluid pressure from developing in the upstream fluid flow volume when the spool is at the open position and fluid is flowing from the inlet port to the seat via the upstream fluid flow volume.

In yet another aspect of the invention, a method is provided for configuring a poppet valve for use in a valve including a valve body. A bore having an upstream wall portion and a downstream wall portion is formed in the valve body. A fluid passage is formed in the valve body terminating at an inlet port in the bore to fluidly connect the fluid passage with the bore at via inlet port. A seat is formed in the bore between the upstream wall portion and the downstream wall portion. A spool having a non-uniform diameter is configured to be able to engage with the seat in the bore so as to block fluid communication past the seat in the bore. The spool is slideably disposed the spool in the bore, such that the spool is slideable between a first position in the bore in which the spool is spaced from the seat so as to provide fluid communication past the seat in the bore, and a second position in the bore in which the spool engages with the seat so as to block fluid communication past the seat in the bore. A downstream volume is formed between the downstream wall portion and the spool surface such that when the spool is in the first position a first effective flow area for fluid passing between the spool and the seat has a first predetermined value. An upstream volume is formed between the upstream wall section and the spool surface. The upstream volume is formed to be partially defined by the inlet port and in fluid communication with the fluid passage, such that a second effective flow area for fluid entering the upstream volume from the inlet port has a second predetermined value not significantly greater than the first predetermined value.

BRIEF DESCRIPTION OF THE DRAWING

FIG. 1 illustrates an embodiment of an annular groove of the invention in an open valve position;

FIG. 2 is a diagrammatic sectional side view of the embodiment of FIG. 1 in a closed valve position; and FIG. 3 is a diagrammatic sectional side view of another embodiment of an annular groove.

BEST MODE FOR CARRYING OUT THE INVENTION

An embodiment incorporating the invention, illustrated in FIGS. 1–2, includes a valve body 201 having a fluid passage 205 and a body bore 207. A seat 213, an inlet port 215 in fluid communication with the fluid passage 205, and an annulus 217 are formed in the body bore 207. A spool 209 is slideable in the bore 207 between an open valve position (FIG. 1) and a closed valve position (FIG. 2). An annular groove 221 in the spool 209, together with the body bore 207, define an upstream fluid flow volume (i.e., a volume upstream of the seat 213) in fluid communication with the inlet port 215.

In the open valve position shown in FIG. 1, the spool 209 is spaced from the seat 213 and fluid can flow from inlet port 215, through the annular groove 221, and past the seat 213 to the annulus 217. The annular groove 221 is configured such that the effective flow area for fluid entering an upstream region 221a of the upstream fluid flow volume from the inlet port effectively equals (or at least does not significantly exceed) the effective flow area for fluid leaving a downstream region 221b (the flow area for fluid passing between the spool and the seat) when the spool 209 moves to its unseated position.

One method of calculating the effective flow area in the upstream region 221a to achieve this configuration is to consider the case of fluid flowing from a round port onto a nearby flat plate, in which case the flow area is the circumference of the port times the distance of the port to the plate. Thus one good way of balancing the respective flow areas is to form the annular groove 221 so that the spool 209 touches the upstream edge of the inlet port 215 and angles away from the inlet port 215 in the downstream direction, as illustrated in FIG. 1, such that (a) the circumference 215C of the inlet port 215 multiplied by its average distance 215D from the spool 209 equals (b) the width 213D of the annular gap between the seat 213 and the spool 209, multiplied by the circumference 213C of the annular gap between the seat 213 and the spool 209.

FIG. 3 shows a portion of another valve in an open valve position. This valve is similar to that shown in FIG. 1, but is an example of a spool 219 having a differently shaped annular groove 222, so that the effective flow areas are not balanced.

In a closed valve position, illustrated in FIG. 2, the spool 209 is forcibly engaged with the seat 213 to block fluid flow. The figures are exaggerated for ease of explanation; the actual spool movement between open and closed valve positions can be quite small.

Industrial Applicability

In experimentation with poppet valve operation it was discovered that an unexpected and undesirable condition can occur that acts to retard valve opening. With reference to FIGS. 1–3, as the spool 209 unseats, fluid from the inlet port 215 enters the annular groove 221, 222 and flows past the seat 213. It was discovered that during this time a significant static pressure develops in a typical annular groove, such as the annular groove 222 in FIG. 3 for example, that produces a force in an upward direction (relative to the figures). This tends to push the spool 219 in FIG. 3 toward its seated position. It was discovered that this occurs because fluid in an upstream region 222a of the typical annular groove 222 tends to stagnate, while the fluid in a downstream region 222b of the typical annular groove 222 flows swiftly past the seat 213. Since slower moving fluid has a higher pressure than faster moving fluid in the same volume, this causes a pressure imbalance that produces the upwardly directed static pressure acting on the spool 219.

This problem is solved by configuring the annular groove 221 (FIGS. 1 and 2) such that the effective flow area in the upstream region 221a (the flow area for fluid entering the upstream fluid flow volume from the inlet port) effectively equals the effective flow area in the in the downstream region 221b (the flow area for fluid passing between the spool and the seat) when the spool 209 moves to its unseated position, as explained above. This eliminates the pressure differential between the two regions 221a and 221b, so that full unseating of the spool is not retarded and the valve reaches maximum fluid flow condition as quickly as possible.

While this invention has been described in conjunction with specific embodiments outlined above, it is evident that many alternatives, modifications and variations will be apparent to those skilled in the art. Accordingly, the preferred embodiments of the invention as set forth herein are intended to be illustrative, not limiting. Various changes may be made without departing from the scope of the claimed invention. Additionally, other aspects and advantages of this invention can be obtained from a study of the disclosure, the drawing figures, and the appended claims.

What is claimed is:

1. A poppet valve, comprising:

a valve body including a bore therein, the bore comprising an inlet port for admitting fluid to the bore, the bore further comprising at least one seat; and a spool having an annular groove, the spool disposed in the bore slideably between at least (1) a fully open position in which the spool is spaced from the seat and the seat is fluidly connected to the inlet port via the annular groove, and (2) a closed position in which the spool is engaging the seat, such that when the spool is at the fully open position the circumference of the inlet port multiplied by its average distance from the spool does not substantially exceed the smallest annular cross-sectional area between the spool and the seat.

2. A poppet valve, comprising:

a valve body including a bore therein, the bore comprising an inlet port for admitting fluid to the bore, the bore further comprising at least one seat;

a spool disposed in the bore slideably between at least (1) a fully open position in which the spool is spaced from the seat, and (2) a closed position in which the spool is engaging the seat, an annular groove in the spool; and pressure controlling means for keeping static fluid pressure from developing in the annular groove when the spool is at the fully open position and fluid is flowing from the inlet port to the seat via the annular groove.

3. The poppet valve of claim 2, the pressure controlling means comprising a configuration of the annular groove such that when the spool is at the fully open position the circumference of the inlet port multiplied by its average distance from the spool does not substantially exceed the smallest annular cross-sectional area between the spool and the seat.

4. A method for configuring a poppet valve for use in a valve including a valve body, comprising:

forming a bore in the valve body;

forming a fluid passage in the valve body, the fluid passage terminating at an inlet port in the bore to fluidly connect the fluid passage with the bore via the inlet port;

forming a seat in the bore;

forming a spool having a surface, an annular groove in the surface, and a non-uniform diameter, and configured to be able to engage with the seat in the bore so as to block fluid communication past the seat in the bore; and slideably disposing the spool in the bore, such that the spool is slideable in the bore between a first position in which the spool is spaced from the seat so as to provide fluid communication from the inlet port, through the annular groove, and past the seat, and a second position, in which the spool engages with the seat so as to block fluid communication past the seat;

such that when the spool is at the fully open position the circumference of the inlet port multiplied by its average distance from the spool does not substantially exceed the smallest annular cross-sectional area between the spool and the seat.

* * * * *